H. LANGE.
CAM MECHANISM FOR NUMBERING HEADS.
APPLICATION FILED JAN. 8, 1917. RENEWED APR. 4, 1919.
1,320,480. Patented Nov. 4, 1919.
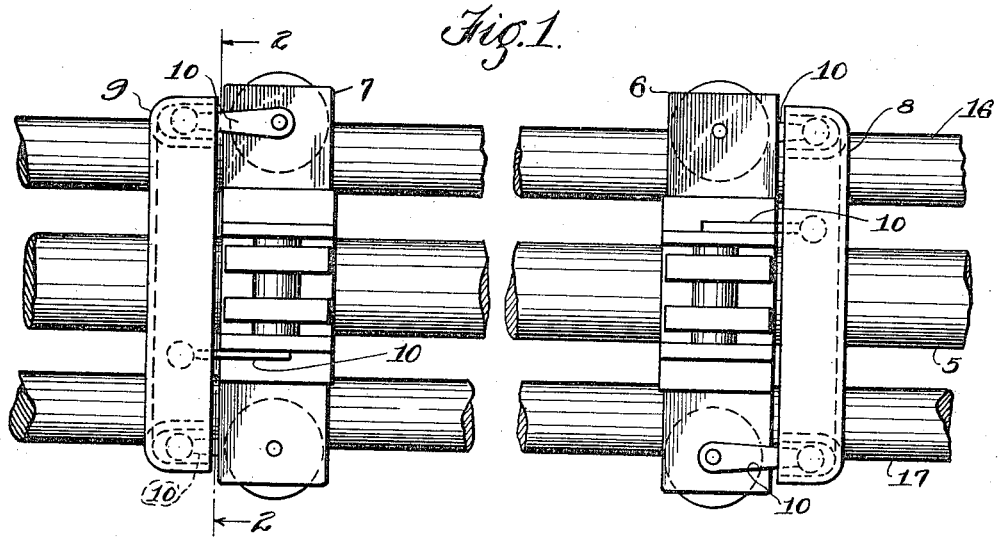
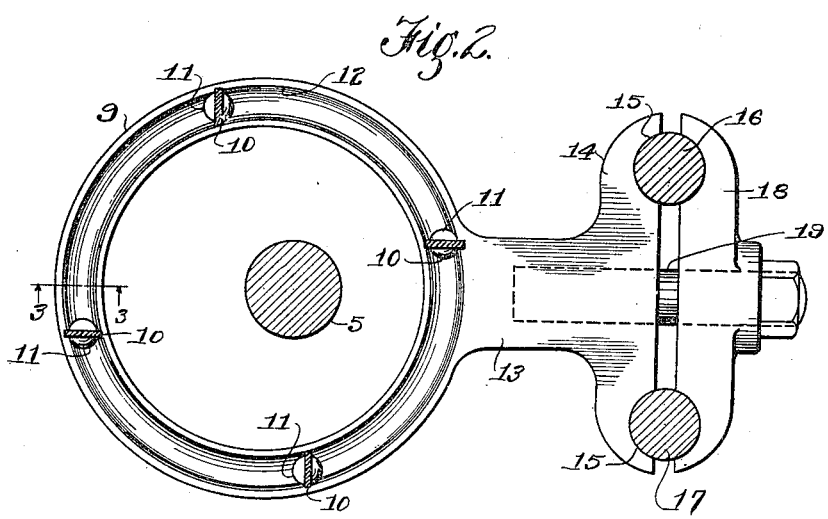
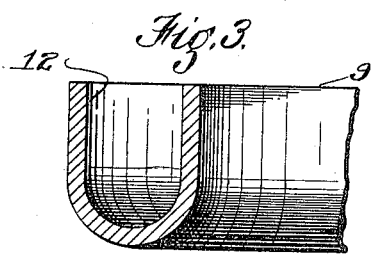
Inventor
Henry Lange.
by
Atty.

UNITED STATES PATENT OFFICE.

HENRY LANGE, OF LOS ANGELES, CALIFORNIA, ASSIGNOR, BY MESNE ASSIGNMENTS, TO OSCAR L. MOORE, OF CHICAGO, ILLINOIS.

CAM MECHANISM FOR NUMBERING-HEADS.

1,320,480. Specification of Letters Patent. Patented Nov. 4, 1919.

Application filed January 8, 1917, Serial No. 141,165. Renewed April 4, 1919. Serial No. 287,615.

*To all whom it may concern:*

Be it known that I, HENRY LANGE, a citizen of the United States residing at Los Angeles, in the county of Los Angeles and State of California, have invented new and useful Improvements in Cam Mechanism for Numbering-Heads, of which the following is a specification.

In using numbering heads with rotary presses it is often desirable to change the position of the head to invert the characters, so when printed will read either from the right or the left of the printed matter. Heads constructed to be operated by a cam member affixed to the press require the reversible cam to reverse the numbering head. Reversing the cam and placing the head on the opposite side thereof results in a disturbance of the timing as the positions of the high and low parts of the cam are then reversed.

It is an object of my invention to provide a cam mechanism so constructed that a reversal of the cam will not reverse the cam points.

I have illustrated an embodiment of my invention in the accompanying drawing, in which:

Figure 1 is a front view of my improved numbering head mechanism.

Fig. 2 is a section as seen on the line 2—2 of Fig. 1.

Fig. 3 is an enlarged section as seen on the line 3—3 of Fig. 2.

A rotatable shaft 5 has mounted thereon numbering heads 6 and 7 which are secured to the shaft so they will rotate therewith. Numbering head 6 is operated through a cam 8, and numbering head 7 through a cam 9. The cams are fixedly secured against rotation. Numbering heads 6 and 7 are of a well known type of construction and are indicated conventionally.

Each head, shown herein, comprises four sets of numbering disks which are actuated by fingers indicated by 10. The fingers 10 are adapted to oscillate and are provided at the ends with followers 11 which ride in a cam grove formed in the cams.

Referring particularly to cam 9, the groove is indicated by 12. The groove 12 is a true circle, and is eccentric to the shaft 5. Arm 13 extends from the cam and is provided with a T 14 having recesses 15 adapted to fit over rods 16 and 17. A clamp member 18 coöperates with the T member 14 to clamp the cam to the rods 16 and 17. A threaded aperture is formed in the arm 13 and a bolt 19 is engaged with the threads in said bore. With my construction the axis passing through the arm of the cam is coincident with a diameter of the cam groove and passes through the center of the shaft 5. This disposes the high and low points of the cam groove in a position, such that when the cam is reversed by turning it over about its axis, the positions of the high and low parts will not be changed.

When it is desired to reverse the position of the numbering head and cam from that in which numbering head 7 and cam 9 are disposed, the bolt 19 is loosened to permit the cam to be turned through an angle of 180 degrees. The cam head 7 is then disposed upon the opposite side of the cam. This position is that in which numbering head 6 and cam 8 are disposed.

In the rotation of shaft 5 the numbering heads are rotated and the fingers 10 ride in the cam slot 12 completing an oscillation in one revolution and changing the numbers. The sides of the angle of oscillation of the fingers 10 is not changed by the reversal of the numbering head and cam. This feature is the important part of my invention. The numbering heads may be keyed upon shaft 5 so that they can be removed or their position changed axially of shaft 5 in order to print at the proper place on the web of paper which passes through the machine. It will also be noted that the numbering heads are easily removable, as the cams may be quickly and conveniently taken down.

What I claim is:

1. The combination of a numbering head secured to a rotatable shaft, said head provided with actuating fingers extending therefrom, and a reversible cam member having the high portion of the cam disposed in the same plane in either position of the cam, said fingers riding on said cam.

2. The combination of a numbering head secured to a rotatable shaft, said head provided with actuating fingers, and a cam member reversible about an axis, the low and high portions of the cam disposed in said axis, said fingers riding on said cam.

3. The combination of a numbering head secured to a rotatable shaft, said head provided with actuating fingers extending therefrom, and a cam reversible about an axis, said cam having a true circle groove eccentric to said shaft, a diameter of said groove coinciding with said axis and extending through the axis of said shaft, said fingers riding in said grooves.

4. The combination of a numbering head secured to a rotatable shaft, said head provided with actuating fingers extending laterally therefrom, and a cam reversible about an axis, said cam having a true circle face groove eccentric to said shaft, a diameter of said groove coinciding with said axis and extending through the axis of said shaft, said fingers riding in said groove.

In witness that I claim the foregoing I have hereunto subscribed my name this 22nd day of December, 1916.

HENRY LANGE.

Copies of this patent may be obtained for five cents each, by addressing the "Commissioner of Patents, Washington, D. C."